United States Patent
Jacobsen et al.

(10) Patent No.: US 9,314,921 B2
(45) Date of Patent: Apr. 19, 2016

(54) ROBOTIC LIFT DEVICE WITH HUMAN INTERFACE OPERATION

(75) Inventors: Stephen C. Jacobsen, Salt Lake City, UT (US); Fraser M. Smith, Salt Lake City, UT (US); John McCullough, Salt Lake City, UT (US); Marc X. Olivier, Salt Lake City, UT (US); Glenn Colvin, Park City, UT (US); Wayco Scroggin, Sandy, UT (US)

(73) Assignee: Sarcos LC, Salt Lake City, UT (US)

( * ) Notice: Subject to any disclaimer, the term of this patent is extended or adjusted under 35 U.S.C. 154(b) by 642 days.

(21) Appl. No.: 13/421,612

(22) Filed: Mar. 15, 2012

(65) Prior Publication Data

US 2012/0237319 A1 Sep. 20, 2012

Related U.S. Application Data

(60) Provisional application No. 61/453,896, filed on Mar. 17, 2011.

(51) Int. Cl.
*B25J 3/04* (2006.01)
*B25J 5/00* (2006.01)
*B25J 9/00* (2006.01)

(52) U.S. Cl.
CPC .. *B25J 3/04* (2013.01); *B25J 5/005* (2013.01); *B25J 5/007* (2013.01); *B25J 9/0087* (2013.01)

(58) Field of Classification Search
CPC ................ B25J 3/00; B25J 3/04; B25J 5/00; B25J 5/005; B25J 5/007; B25J 5/06; B25J 9/0006; B25J 9/0084; B25J 9/0087
USPC ........... 414/1, 2, 3, 4, 5, 6, 7; 601/5; 700/245, 700/250, 257, 260, 264; 901/1
See application file for complete search history.

(56) References Cited

U.S. PATENT DOCUMENTS 1,880,138 A * 9/1932 Hubl .............................. 212/290
3,280,991 A 10/1966 Melton et al.
(Continued)

FOREIGN PATENT DOCUMENTS

EP 0616275 9/1998
EP 1037264 A2 9/2000
(Continued)

OTHER PUBLICATIONS

Aliens (Movie), Starring Sigourney Weaver, Directed by James Cameron, Written by James Cameron, David Giler, Walter Hill, Dan O'Bannon, and Ronal Shusett, Released 1986 by Twentieth Century Fox, Scenes at Playtime 00:26:31-00:26:59 & 00:27:40-00:28:05 & 02:08:25-02:10:39.*

(Continued)

*Primary Examiner* — Ernesto Suarez
*Assistant Examiner* — Brendan Tighe

(57) ABSTRACT

An operator controllable robotic device is disclosed. The robotic device comprises a support member, an upper robotic arm, a lower robotic arm, and a control arm. The upper robotic arm is coupled to the support member and has rotational movement in at least one degree of freedom relative to the support member. The lower robotic arm is coupled to the upper robotic arm and has rotational movement in at least one degree of freedom relative to the upper robotic arm. The control arm allows an operator to control the robotic device. The control arm is coupled to the upper robotic arm and has rotational movement in at least one degree of freedom relative to the upper robotic arm. The control arm allows a movement of the operator to control a movement of at least one of the upper robotic arm and the lower robotic arm.

22 Claims, 3 Drawing Sheets

(56) References Cited

U.S. PATENT DOCUMENTS

| | | | |
|---|---|---|---|
| 4,046,262 A * | 9/1977 | Vykukal et al. | 414/5 |
| 4,179,233 A | 12/1979 | Bromell et al. | |
| 4,251,791 A | 2/1981 | Yanagisawa et al. | |
| 4,483,407 A | 11/1984 | Iwamoto et al. | |
| 4,567,417 A | 1/1986 | Francois et al. | |
| 4,591,944 A | 5/1986 | Gravel | |
| 4,661,032 A | 4/1987 | Arai | |
| 4,666,357 A | 5/1987 | Babbi | |
| 4,762,455 A | 8/1988 | Coughlan et al. | |
| 4,768,143 A | 8/1988 | Lane et al. | |
| 4,853,874 A | 8/1989 | Iwamoto et al. | |
| 4,883,400 A | 11/1989 | Kuban et al. | |
| 4,915,437 A | 4/1990 | Cherry | |
| 4,921,292 A | 5/1990 | Harwell et al. | |
| 4,997,095 A | 3/1991 | Jones et al. | |
| 5,004,391 A | 4/1991 | Burdea | |
| 5,038,089 A | 8/1991 | Szakaly | |
| 5,072,361 A | 12/1991 | Davis et al. | |
| 5,101,472 A | 3/1992 | Repperger | |
| 5,105,367 A | 4/1992 | Tsuchihashi et al. | |
| 5,239,246 A | 8/1993 | Kim | |
| 5,282,460 A | 2/1994 | Boldt | |
| 5,336,982 A | 8/1994 | Backes | |
| 5,399,951 A | 3/1995 | Lavallee et al. | |
| 5,797,615 A | 8/1998 | Murray | |
| 5,845,540 A * | 12/1998 | Rosheim | 74/490.05 |
| 5,949,686 A | 9/1999 | Yoshinada et al. | |
| 5,967,580 A | 10/1999 | Rosheim | |
| 5,994,864 A | 11/1999 | Inoue et al. | |
| 6,016,385 A * | 1/2000 | Yee et al. | 700/245 |
| 6,170,162 B1 | 1/2001 | Jacobsen et al. | |
| 6,272,924 B1 | 8/2001 | Jansen | |
| 6,301,526 B1 | 10/2001 | Kim et al. | |
| 6,338,605 B1 | 1/2002 | Halverson et al. | |
| 6,340,065 B1 | 1/2002 | Harris | |
| 6,360,166 B1 | 3/2002 | Alster | |
| 6,394,731 B1 | 5/2002 | Konosu et al. | |
| 6,430,473 B1 | 8/2002 | Lee et al. | |
| 6,507,163 B1 | 1/2003 | Allen | |
| 6,554,342 B1 | 4/2003 | Burnett | |
| 6,659,703 B1 | 12/2003 | Kirkley | |
| 6,663,154 B2 | 12/2003 | Pancheri | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 * | 8/2008 | Schiele et al. | 414/4 |
| 7,783,384 B2 | 8/2010 | Kraft | |
| 7,862,524 B2 | 1/2011 | Carignan et al. | |
| 7,965,006 B2 | 6/2011 | Kang et al. | |
| 8,024,071 B2 | 9/2011 | Komatsu et al. | |
| 8,151,401 B2 | 4/2012 | Cheyne | |
| 8,295,975 B2 | 10/2012 | Arimatsu et al. | |
| 8,452,447 B2 | 5/2013 | Nixon | |
| 8,473,101 B2 | 6/2013 | Summer | |
| 8,511,192 B2 | 8/2013 | Hirtt | |
| 8,529,582 B2 | 9/2013 | Devengenzo et al. | |
| 8,560,118 B2 | 10/2013 | Greer et al. | |
| 2001/0033146 A1 | 10/2001 | Kato | |
| 2003/0152452 A1 | 8/2003 | Hodgson | |
| 2004/0037681 A1 | 2/2004 | Marcotte | |
| 2005/0193451 A1 | 9/2005 | Quistgaard et al. | |
| 2005/0251110 A1 | 11/2005 | Nixon | |
| 2006/0149419 A1 | 7/2006 | Ogawa et al. | |
| 2006/0184275 A1 | 8/2006 | Hosokawa et al. | |
| 2006/0245897 A1 | 11/2006 | Hariki et al. | |
| 2007/0105070 A1 | 5/2007 | Trawick | |
| 2007/0123997 A1 | 5/2007 | Herr et al. | |
| 2008/0281468 A1 | 11/2008 | Jacobsen et al. | |
| 2009/0038258 A1 | 2/2009 | Pivac et al. | |
| 2009/0039579 A1 | 2/2009 | Clifford et al. | |
| 2009/0210093 A1 | 8/2009 | Jacobsen | |
| 2010/0050947 A1 | 3/2010 | Kortekaas | |
| 2010/0089855 A1 | 4/2010 | Kjolseth | |
| 2010/0198402 A1 | 8/2010 | Greer et al. | |
| 2010/0295497 A1 | 11/2010 | Takamatsu | |
| 2011/0046781 A1 | 2/2011 | Summer | |
| 2011/0071677 A1 | 3/2011 | Stillman | |
| 2012/0000891 A1 | 1/2012 | Nakanishi | |
| 2012/0065902 A1 | 3/2012 | Nakajima | |
| 2012/0237319 A1 | 9/2012 | Jacobsen et al. | |

FOREIGN PATENT DOCUMENTS

| | | |
|---|---|---|
| EP | 1258324 | 11/2002 |
| JP | 52013252 | 2/1977 |
| JP | H01-295772 | 11/1989 |
| JP | H02-51083 | 4/1990 |
| JP | H03-85398 | 8/1991 |
| JP | HO4 44296 | 4/1992 |
| JP | 5004177 | 1/1993 |
| JP | H07-1366 | 1/1995 |
| JP | 7060679 | 3/1995 |
| JP | H07-112377 | 5/1995 |
| JP | HO7-31291 | 6/1995 |
| JP | H07-246578 | 9/1995 |
| JP | 9011176 | 1/1997 |
| JP | 11130279 | 5/1999 |
| JP | 2005/334999 | 12/2005 |
| JP | 3909770 B2 | 4/2007 |
| JP | 2010098130 A | 4/2010 |
| WO | WO 2007/144629 | 12/2007 |
| WO | WO 2009/143377 | 11/2009 |

OTHER PUBLICATIONS

Bauman; Utah Firm Markets on Big Gorilla of an Arm; Deseret News; Jan. 27, 1993; 2 pages.

Jacobsen; Science, Robotics, and Superheroes; Presented at University of Utah's Science at Breakfast, Mar. 17, 2010; 16 pages.

Heavy-Duty Magnetic Base, 300 lb (1334 N) Holding Force, ¼-20Thread; Newport; http://search.newport.com/?q=*&x2=sku&q2=200; as accessed Apr. 23, 2011; 1 page.

Jacobsen et al; Research Robots for Applications in Artificial Intelligence, Teleoperation and Entertainment; The International Journal of Robotics Research; Apr.-May 2004; pp. 319-330; vol. 23, No. 4-5.

Kim et al; A Force Reflected Exoskeleton-Type Masterarm for Human-Robot Interaction; IEEE Transactions on Systems, Man and Cybertentics—Part A: Systems and Humans; Mar. 2005; pp. 198-212; vol. 35, No. 2.

Manipulator Dynamics; Amikabir University of Technology; Computer Engineering and Information Technology Department; Power Point; 44 pages.

Schuler et al; Dextrous Robot Arm; in Proceedings of the 8$^{th}$ ESA Workshop on Advanced Space Technologies for Robotic and Automation; Astra 2004 ESTEC, Noordwijk, The Netherlands, Nov. 2-4, 2004; 8 pages.

Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.

Tmsuk, Rescue Robot "T-☐☐ 53" release Control Technologies to Control the Synchronous Operation of the Arm; http://robot.watch.impress.co.ip/cda/news/2007/07/18/564.html; as accessed Sep. 1, 2011; 5 pages.

U.S. Appl. No. 13/332,129, filed Dec. 20, 2011; Stephen C. Jacobsen.
U.S. Appl. No. 13/332,138, filed Dec. 20, 2011; Stephen C. Jacobsen.
U.S. Appl. No. 13/332,146, filed Dec. 20, 2011; Stephen C. Jacobsen.
U.S. Appl. No. 13/332,152, filed Dec. 20, 2011; Stephen C. Jacobsen.
U.S. Appl. No. 13/332,160, filed Dec. 20, 2011; Stephen C. Jacobsen.
U.S. Appl. No. 13/332,165, filed Dec. 20, 2011; Stephen C. Jacobsen.

Yeates; Utah-Built Robot Safeguards the Workplace; http://www.ksl.com?nid=148&sid=17654421&autostart=y; Oct. 13, 2011; 3 pages.

Giant Robot Grabbing Hands Grab All They Can; Jul. 17, 2007; 3 pages ; www.digitalworldtokyo.com/index.php/digital_tokyo/articles/giant_robot_grabbing_hands_grab_all_they_can/.

Industrial Magnetics, Inc.—PowerLift® Magnets; www.magnetics.com/product.asp?ProductID=1; 2 pages; as accessed Nov. 6, 2012.

Magnetic Base; www.ask.com/wiki/magnetic_base; 2 pages; page last updated Sep. 12, 2012.

(56) References Cited

OTHER PUBLICATIONS

PCT/US2012/035553; filed Apr. 27, 2012; Raytheon; International Search Report dated Oct. 31, 2012.
U.S. Appl. No. 13/332,129, filed Dec. 20, 2011; Stephen C. Jacobsen; office action issued Dec. 23, 2013.
PCT/US2012/035570; filed Apr. 27, 2012; Raytheon Company; International Search Report dated Feb. 8, 2013.
PCT/US2012/038811; filed Apr. 27, 2012; Raytheon Company; International Search Report dated Feb. 13, 2013.
U.S. Appl. No. 13/332,129, filed Dec. 20, 2011; Stephen C. Jacobsen; office action dated Jun. 17, 2014.
U.S. Appl. No. 13/332,160, filed Dec. 20, 2011; Stephen C. Jacobsen; notice of allowance mailed Jul. 8, 2014.
U.S. Appl. No. 13/332,146, filed Dec. 20, 2011; Stephen C. Jacobsen; office action dated Jul. 24, 2014.
U.S. Appl. No. 13/332,152, filed Dec. 20, 2011; Stephen C. Jacobsen; notice of allowance mailed Aug. 20, 2014.
Barras; "Stabilization of a Biped Robot with its arms—A Practical Approach"; May 1, 2010; http://biorob.epfl.ch/files/content/sites/biorob/filed/users/170220/public/Report.pdf; retrieved on Jul. 10, 2013.
Moosavian, et al.; "Dynamics Modeling and Tip-Over Stability of Suspended Wheeled Mobile Robots with Multiple Arms"; Oct. 29, 2007; IEEE; pp. 1210-1215.
PCT/US2012/035609; filed Apr. 27, 2012; Raytheon Company; search report dated Jul. 29, 2013.
PCT/US2012/035620; filed Apr. 27, 2012; Raytheon Company; search report dated Jul. 7, 2013.
PCT/US2012/035592; filed Apr. 27, 2012; Raytheon Company; search report dated Feb. 8, 2013.
U.S. Appl. No. 13/332,138, filed Dec. 20, 2011; Stephen C. Jacobsen; Notice of Allowance mailed Oct. 10, 2014.
U.S. Appl. No. 13/332,129, filed Dec. 20, 2011; Stepehn C. Jacobsen; Notice of Allowance mailed Oct. 24, 2014.
U.S. Appl. No. 13/332,165, filed Dec. 20, 2011; Stephen C. Jacobsen; office action dated Jan. 7, 2015.
U.S. Appl. No. 13/332,146, filed Dec. 20, 2011; Stephen C. Jacobsen; office action dated Nov. 17, 2014.
U.S. Appl. No. 14/606,962, filed Jan. 27, 2015; Stephen C. Jacobsen; office action dated Apr. 14, 2015.
U.S. Appl. No. 13/332,165, filed Dec. 20, 2011; Stephen C. Jacobsen; office action dated Apr. 17, 2015.
Office Action for U.S. Appl. No. 13/332,146 dated Sep. 4, 2015, 25 pages.
Office Action for U.S. Appl. No. 13/332,165 dated Oct. 2, 2015, 11 pages.
Office Action for U.S. Appl. No. 14/606,962 dated Sep. 4, 2015, 24 pages.
PCT/US2012/035511; filed Apr. 27, 2012; Raytheon Company; International Search report dated Mar. 4, 2013.
U.S. Appl. No. 13/332,138, filed Dec. 20, 2011; Stephen C. Jacobsen; office action dated Mar. 10, 2014.
U.S. Appl. No. 13/332,160, filed Dec. 20, 2011; Stephen C. Jacobsen; office action dated Mar. 12, 2014.
U.S. Appl. No. 13/332,152, filed Dec. 20, 2011; Stephen C. Jacobsen; office action dated Mar. 28, 2014.
Office Action for U.S. Appl. No. 13/841,006 dated Nov. 19, 2015, 28 pages.
Office Action for U.S. Appl. No. 14/543,733 dated Jan. 25, 2016, 23 pages.

* cited by examiner

ROBOTIC LIFT DEVICE WITH HUMAN INTERFACE OPERATION

RELATED APPLICATION

This application claims the benefit of U.S. Provisional Application No. 61/453,896, filed Mar. 17, 2011, which is incorporated by reference herein in its entirety.

BACKGROUND

The possibility of integrating humans and robotic machines in one system offers many opportunities for creating a new generation of assistance technology that can be used in biomedical, industrial, military, and aerospace applications. The human component contributes its natural and highly developed control capabilities that implement advanced decision making and sensing mechanisms, while the robotic component offers technological advantages such as power, accuracy and speed. An integrated operator and robotic device can be particularly useful in lifting and moving heavy objects. One such device could do the work of several individuals, which can increase efficiency and improve safety.

SUMMARY

It has been recognized that it would be advantageous to develop an integrated operator and robotic device that can lift and move heavy objects. Accordingly, the present disclosure provides an operator controllable robotic device. The robotic device can comprise a support member, an upper robotic arm, a lower robotic arm, and a control arm. The upper robotic arm can have a proximal end coupled to the support member and have rotational movement in at least one degree of freedom relative to the support member. The lower robotic arm can have a proximal end coupled to a distal end of the upper robotic arm and have rotational movement in at least one degree of freedom relative to the upper robotic arm. The control arm can allow an operator to control the robotic device. The control arm can be coupled to the upper robotic arm and can have rotational movement in at least one degree of freedom relative to the upper robotic arm. The control arm can allow the operator to interact with the robotic device such that a movement of the operator can control a movement of at least one of the upper robotic arm and the lower robotic arm.

Additional features and advantages of the present disclosure will be apparent from the detailed description which follows, taken in conjunction with the accompanying drawings, which together illustrate, by way of example, features of the present disclosure.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Figure 1:
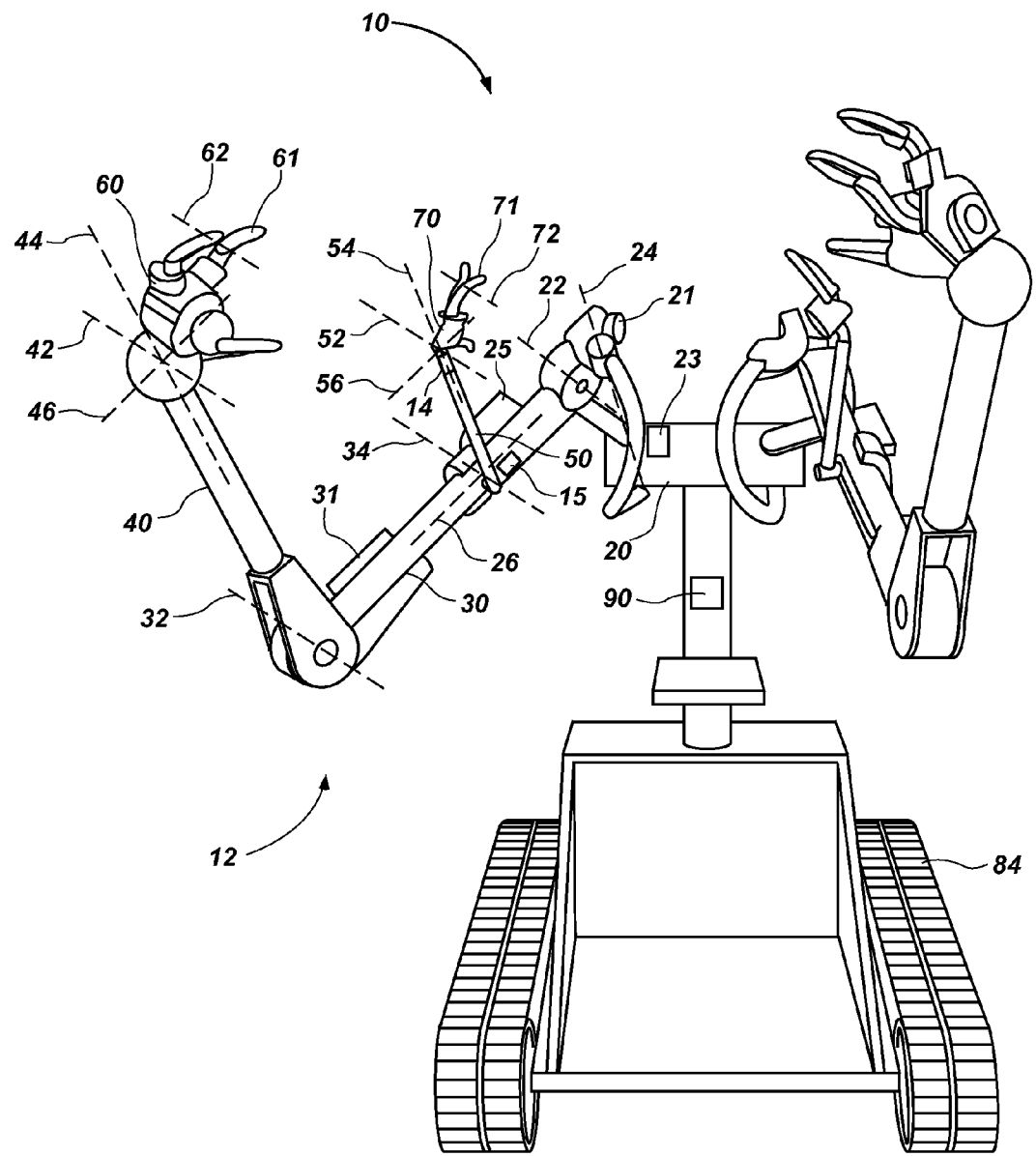
FIG. 1 is an operator controllable robotic device, in accordance with an example of the present disclosure.

Reference will now be made to certain examples, and specific language will be used herein to describe the same. Examples discussed herein set forth an operator controllable robotic device that can lift and move heavy objects.

With the general examples set forth above, it is noted that when describing the operator controllable robotic device, system, and methods, each of these descriptions are considered applicable to the other, whether or not they are explicitly discussed in the context of that example. For example, in discussing the operator controllable robotic device per se, system and/or method examples are also included in such discussions, and vice versa.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting.

It must be noted that, as used in this specification and the appended claims, the singular forms "a," "an," and "the" include plural referents unless the context clearly dictates otherwise.

Also, it is noted that various modifications and combinations can be derived from the present disclosure and illustrations, and as such, the following figure should not be considered limiting.

In describing and claiming the present disclosure, the following terminology will be used in accordance with the definitions set forth below.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims unless otherwise stated. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Referring to FIG. 1, illustrated is an operator controllable robotic device 10. The robotic device can include a support member 20 that supports a robotic arm 12. An operator located proximate to the robotic arm can control the robotic arm with movements of the operator's own arm. Thus, in certain aspects, the robotic arm can be configured to approximate, at least in part, characteristics of a human arm.

For example, the robotic arm 12 can include an upper robotic arm 30. A proximal end of the upper robotic arm is coupled to the support member 20. In one aspect, the upper robotic arm has rotational movement in at least one degree of freedom relative to the support member. As shown in FIG. 1, for example, the upper robotic arm can rotate about axis 22, axis 24, and axis 26. Thus, the relationship between the upper robotic arm and the support member can approximate a characteristic of a human shoulder joint.

Additionally, the robotic arm 12 can include a lower robotic arm 40. A proximal end of the lower robotic arm is coupled to a distal end of the upper robotic arm. In one aspect, the lower robotic arm has rotational movement in at least one degree of freedom relative to the upper robotic arm. As shown in FIG. 1, for example, the lower robotic arm can rotate about axis 32. Thus, the lower robotic arm and the upper robotic arm can approximate a characteristic of a human elbow joint.

The robotic device 10 can be configured to pick up and move an object. Accordingly, in one aspect, the lower robotic arm 40 includes a holding device or end effector 60 coupled to a distal end of the lower robotic arm to hold and secure an object. The holding device can comprise a clamp, hook, bucket, magnet, or any other holding device suitable for a given situation or object. In a specific aspect, the holding device has movement in at least one degree of freedom relative to the lower robotic arm. As shown in FIG. 1, for example, the holding device can rotate about axis 42, axis 44, and axis 46. Thus, the relationship between the holding device and the lower robotic arm can approximate a characteristic of a human wrist.

It should be recognized that the robotic arm can include more or less rotational degrees of freedom than a human arm and/or degrees of freedom not found in a human arm, such as translational degrees of freedom.

The robotic device 10 can further include a control arm 50 to allow the operator to control the robotic arm 12. The control arm is coupled to the upper robotic arm 30 and has rotational movement in at least one degree of freedom relative to the upper robotic arm. As shown in FIG. 1, for example, the control arm can rotate about axis 34. Thus, the control arm and the upper robotic arm can approximate a characteristic of a human elbow joint.

The control arm 50 allows the operator to interact with the robotic device 10 such that a movement of the operator controls a movement of at least one of the upper robotic arm 30 and the lower robotic arm 40. In one aspect, shown in FIG. 1, the control arm is coupled to the upper robotic arm between the proximal end and the distal end of the upper robotic arm. Thus, the upper robotic arm can extend beyond the operator's upper arm to allow the robotic arm to reach objects that are beyond the reach of the operator. Additionally, the robotic arm can lift and move large and/or heavy objects that the operator cannot move alone without the robotic device. The upper robotic arm and the lower robotic arm can move based on the operator's movements and can serve as a powerful extension of the operator's own arm. Thus, in one aspect, a total extended length of the upper robotic arm and the lower robotic arm can be between about four feet and about twenty feet.

To control movement of the holding device 60, the control arm 50 can include a wrist controller 70 coupled to the control arm and have rotational movement in at least one degree of freedom relative to the control arm. As shown in FIG. 1, for example, the wrist controller can rotate about axis 52, axis 54, and axis 56. Thus, the relationship between the wrist controller and the control arm can approximate a characteristic of a human wrist.

Although the present example of the control arm 50 provides for movement in the same or similar degrees of freedom as the robotic arm, this need not be the case as the control arm can provide movement in more or less degrees of freedom than the robotic arm.

In a specific aspect, the holding device 60 comprises a clamp 61 to grasp and hold an object. To control movement of the clamp, the control arm 50 includes a finger controller 71 coupled to the wrist controller 70 that has movement in at least one degree of freedom relative to the wrist controller. As shown in FIG. 1, for example, the clamp can rotate about axis 62 and the finger controller can rotate about axis 72. Thus, the clamp and the finger controller can approximate a characteristic of a human finger. In another aspect, the clamp can move in at least one translational degree of freedom to grasp and hold an object. The translational degree of freedom can be controlled by the finger controller even if the finger controller operates in a rotational degree of freedom.

With continuing reference to FIG. 1, the robotic device 10 can further include sensors 14, 15 coupled to at least one of the control arm 50 and the upper robotic arm 30. In certain aspects, the sensors 14, 15 comprise at least one force sensor. One or more force sensors can be incorporated into the robotic device and each force sensor can be capable of sensing forces in one or more degrees of freedom. For example, sensor 14 can be a force sensor capable of sensing forces in six degrees of freedom. The force sensors are capable of detecting linear and/or rotational forces acting on the robotic device. In one aspect, the sensitivity of the force sensors may be adjustable. For example, the force sensors can be configurable to respond only when a force is applied to the force sensor which exceeds a predetermined level.

The force sensors can be used to sense an adjustable controlling interface force status relationship (IFSR) between the force sensors and the operator to control a movement of at least one of the upper robotic arm and the lower robotic arm. An example of robotic movement control using force sensors is disclosed in U.S. patent application Ser. No. 11/879,448, filed on Jul. 16, 2007 titled "Contact Displacement Actuator System," which is incorporated herein by reference in its entirety.

"Interface force status relationship" relates to a preferred positional relationship of the robotic arm to the operator. In one example, when the robotic arm 12 is not moving, the upper arm of the operator may not be in forceful contact with a force sensor, such as sensor 15 coupled to the upper robotic arm 30. In this case, the operator needs to apply a force to the upper robotic arm (via the force sensor), if movement of the robotic arm is desired, such as by moving the upper arm to the side to contact the upper robotic arm. This movement results in modification of the non-contacting status of the IFSR, to one of physical contact between the upper arm of the operator and the upper robotic arm. The robotic arm will respond to this contact by an appropriate movement to "get out of the way." Such response may be sequentially repeated many times until the movement of the operator's upper arm is completed. At this point, the force status relationship is again stable in the non-contacting position and movement is suspended.

In another example, it may be desirable to maintain an upper arm of the operator in contact with the upper robotic arm 30. A force sensor, such as sensor 15, can be disposed at the desired contact location. With the operator's upper arm in contact with the force sensor, the result is a given applied force to the force sensor from the upper arm. This IFSR is based on actual contact between the upper arm and the force sensor. As the operator moves the upper arm away from the upper robotic arm and the force sensor, a non-contacting relationship arises. The upper robotic arm will then respond in an effort to reinstate the loaded contact between the operator's upper arm and the upper robotic arm. In this case, therefore, the IFSR is the contacting relationship where the operator's upper arm is forcefully contacting the upper robotic arm.

The force sensors are capable of detecting a baseline controlling interface force status relationship between the force sensors and the operator. The force sensors output a force signal to a force computational system (embodied in processor 90), which is electronically coupled to the force sensors. Based on the output force signal from the force sensors, the force computation system calculates a linear and rotational force required to maintain the controlling force status relationship, whether it is a contacting or non-contacting relationship. The force computational system then generates and transmits an actuation signal to a drive system attached to the robotic arm 12. Thus, in one aspect, the robotic device 10 can include a control system that controls a movement of the upper robotic arm 30 and the lower robotic arm 40. The control system can include the force sensors and the force computational system.

To maintain the controlling force status relationship between the operator and the robotic device 10, the drive system can be coupled to at least one of the support member 20, the control arm 50, and the upper robotic arm 30. For example, drive systems 21, 23, 25, and 31 can be coupled to the support member and the upper robotic arm to cause movement about axes 22, 24, 26, and 32, respectively. A drive system may be incorporated into the control arm, as desired, if the control arm is to respond to the operator's movements based on a controlling force status relationship between the operator and the control arm. The drive system can receive the transmitted force actuation signal from the force computational system on an ongoing basis and displace a portion of at least one of the control arm and the upper robotic arm in order to maintain the controlling force status relationship. In one aspect, where no displacement is desired but the load on the robotic arm has changed, the drive system can increase or decrease the linear and rotational forces on the robotic arm 12 as needed to maintain the controlling force status relationship until the movement is completed.

In certain aspects, the sensors 14, 15 comprise at least one position sensor. Thus, the robotic device 10 can further include a position sensor coupled to the control arm 50 and/or the upper robotic arm 30 to sense a position of the control arm to control movement of the lower robotic arm 40. One or more position sensors can be incorporated into the robotic device and each position sensor can be capable of sensing position in one or more degrees of freedom.

A position sensor can be any device that measures position. Additionally, a position sensor can be an absolute position sensor or a relative position (i.e. displacement) sensor and can measure linear or angular position. Non-limiting examples of position sensors include inductive non-contact position sensors, string potentiometers (string pot), linear variable differential transformers (LVDT), potentiometers, capacitive transducers, eddy-current sensors, Hall effect sensors, proximity sensors (optical), grating sensors, rotary encoders (angular), piezo-electric transducers, photodiode arrays, etc.

In certain aspects, a position sensor can be configured to measure position of each degree of freedom on the robotic arm 12. For example, position sensors can be configured to measure angular position of the upper robotic arm 30 about axis 22, axis 24, and/or axis 26. Likewise, a position sensor can be configured to measure angular position of the control arm 50 about axis 34. Still further, position sensors can be configured to measure angular position of the wrist controller 70 about axis 52, axis 54, and/or axis 56. In one aspect, a single position sensor can be configured to measure position in multiple degrees of freedom.

The position sensors output a position signal to a position computational system (embodied in processor 90). Based on the position signal, the position computational system calculates a position for at least one of the upper robotic arm 30 and the lower robotic arm 40. The position computational system then generates and transmits a position signal to a drive system attached to the robotic arm 12. Thus, in one aspect, the control system that controls a movement of the upper robotic arm and the lower robotic arm can include the position sensors and the position computational system.

In certain aspects, the position computational system can be integrated to any degree with the force computational system discussed above. Thus, the position computations and the force computations can be performed to account for both types of sensor data and their respective locations on the robotic device 10 to correctly locate the robotic arm 12 and/or the control arm 50 in response to the operator's movements.

For control based on position measurements, the drive system can be attached to at least one of the upper robotic arm 30 and the lower robotic arm 40. The drive system can receive the transmitted position signal from the position computational system on an ongoing basis and displace at least one of the upper robotic arm and the lower robotic arm. In certain aspects, the drive system can be the same drive system discussed above with reference to the force sensors and force computational system.

The control system can utilize a control scheme to move the upper robotic arm 30 that is different than a control scheme to move the lower robotic arm 40. In one aspect, the control arm 50 can include only position sensors (no force sensors). For example, the operator can physically move the control arm, which movement is detected by a position sensor, and the data is used to cause the lower robotic arm to move accordingly. The upper robotic arm can include a force sensor coupled to the upper robotic arm to sense an adjustable controlling interface force status relationship between the force sensor and the operator to control a movement of the upper robotic arm. Thus, the upper robotic arm can be operated with one control scheme and the lower robotic arm can be operated with another control scheme.

In another aspect, the control arm 50 can include only force sensors (no position sensors). In this case, data related to maintaining the controlling force status relationships between the operator and the control arm can be used to move the lower robotic arm 40 based on the operator's movements. The force computational system can utilize data related to drive system actuation signals to determine how to direct the lower robotic arm in response to the operator's movements. For example, when the operator's lower arm moves, the force computational system can generate an actuation signal to direct movement of the control arm based on data received from the force sensors in the control arm. The force computational system can utilize the data for determining how to move the control arm and apply that data to generating an actuation signal to move the lower robotic arm in accordance with the operator's movement.

In yet another aspect, the control arm 50 can include both force and position sensors. Thus, the force sensors can be utilized, as discussed above, to move the control arm and/or the upper robotic arm 30 in response to the operator's movement. The position sensors can be utilized to measure the movement of the control arm in response to movements by the operator in order to move the lower robotic arm 40. This is another example of utilizing one control scheme to operate the upper robotic arm and another control scheme to operate the lower robotic arm.

Additionally, sensors can be utilized, as discussed above, to control movement of the holding device 60 and/or clamp 61. For example, position and/or force sensors can measure the position and/or force of the wrist controller 70 and the finger controller 71. Thus, movements of the operator's wrist and finger can control movements of the holding device and clamp.

Figure 2:
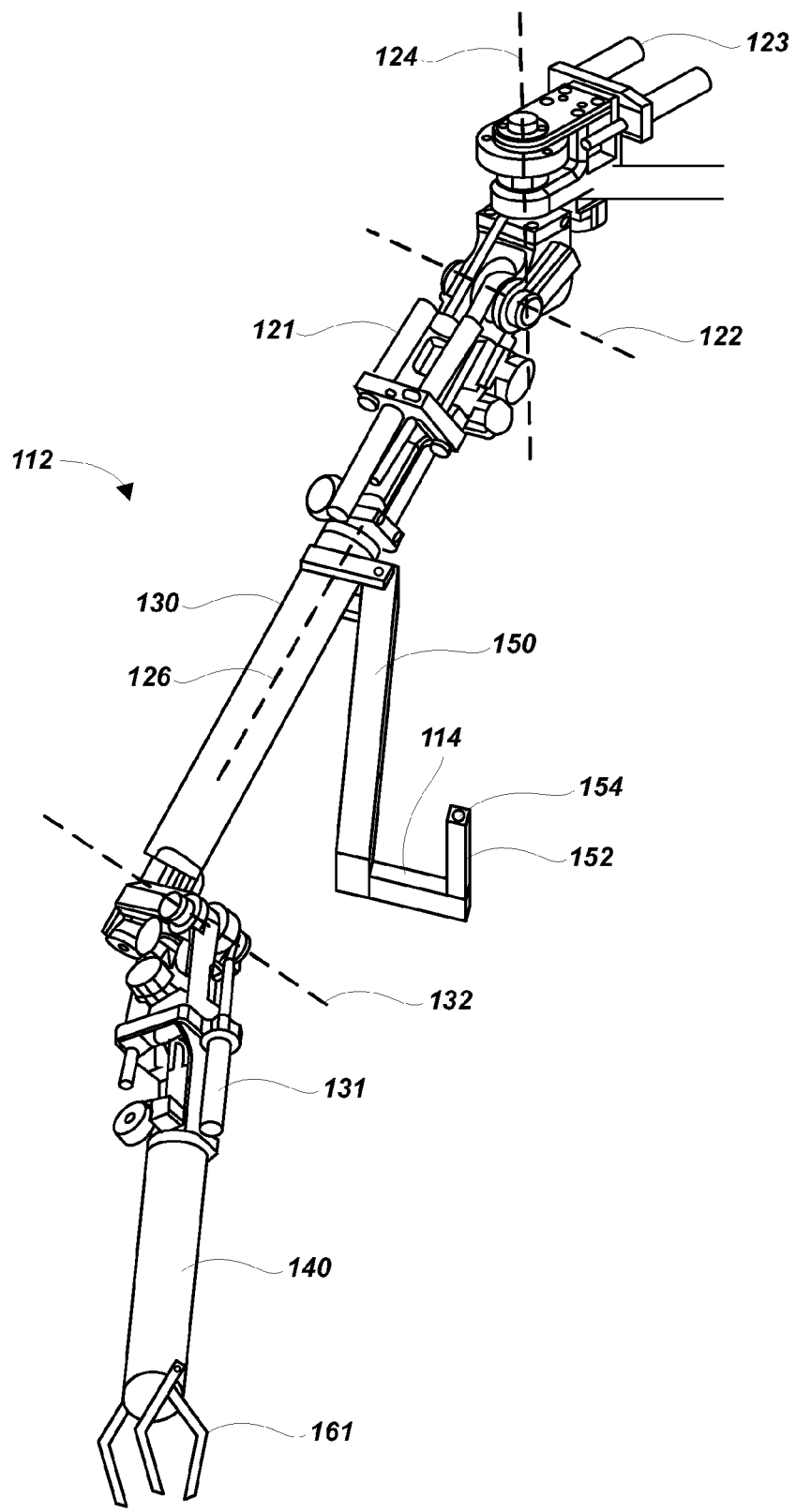
FIG. 2 is a robotic arm including an upper robotic arm, a lower robotic arm, and a control arm, in accordance with an example of the present disclosure.

With reference to FIG. 2, illustrated is a front view of a robotic arm 112 including an upper robotic arm 130, a lower robotic arm 140, and a control arm 150, in accordance with an example of the present disclosure. As shown in the figure, movement in the various degrees of freedom of the robotic arm about axes 122, 124, and 132 are caused by drive systems 121, 123, and 131, respectively. The drive systems, for example, can include pairs of hydraulic actuators that can be employed to cause rotational movement for each rotational degree of freedom about an axis. The piston (not shown) within a drive system can be extended or retracted to adjust the relative position of the robotic arm and/or control arm. Delivery of hydraulic fluid through control valves can activate displacement of the piston. Hydraulic fluid can be pressurized or driven by an internal combustion (IC) engine or other power conversion device.

While specific reference is made herein to hydraulic fluid actuator systems, it is understood that any actuator system capable of creating a mechanical force to move a portion of the robotic arm is contemplated for use herein. For example, electric motors, pneumatic actuators, magnetic actuators, etc. can be used in drive systems in accordance with the present disclosure. Drive systems can also use gears, tendons, cranks, bearings, pulleys, kinematic mechanisms, or any other power delivery or conversion device to provide a mechanical force to a portion of the robotic arm and/or control arm.

Several of the drive systems shown in FIG. 2 are readily visible to an observer of the robotic device. It should be recognized, however, that drive systems can be incorporated within structural and/or cosmetic members of the robotic device such that the drive systems are hidden from view. For example, movement of the robotic arm about axis 126 can be caused by a rotary actuator disposed inside of the upper robotic arm 130.

FIG. 2 further illustrates a control arm 150 having a handle 152. A sensor 114 is disposed between the handle and the control arm. The sensor can include position and/or force sensors that measure position and/or force in at least one degree of freedom. Thus, the operator can grasp the handle to manipulate the control arm, thereby causing the upper robotic arm and/or the lower robotic arm to move, as discussed above.

The robotic arm 112 can also include a clamp 161 to pick up, hold, and move objects. The drive system for the clamp can be an actuator disposed inside the lower robotic arm 140. The clamp can be controlled by a switch 154 disposed on the handle 152 of the control arm 150. Thus, the control arm does not need to have position or force sensors to allow the operator to operate the clamp.

Figure 3:
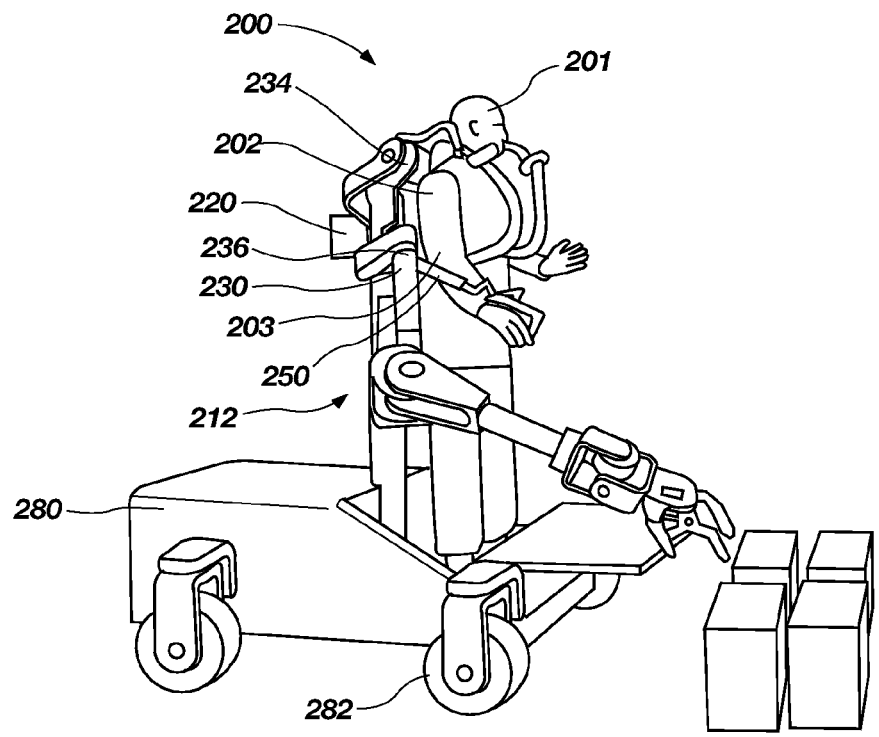
FIG. 3 illustrates an operator controlling a robotic device, in accordance with an example of the present disclosure.

With reference to FIG. 3, illustrated is a robotic device 200 in accordance with an example of the present disclosure. The robotic device is shown with an operator 201 using the robotic device to lift and move objects. Thus, certain relational aspects of the operator and the robotic device can be seen in this figure. For example, the proximal end 234 of the upper robotic arm 230 can be positioned to be proximate to a shoulder 202 of the operator. Additionally, the coupling 236 of the control arm 250 and the upper robotic arm can be positioned to be proximate to an elbow 203 of the operator. As shown in the figure, the upper robotic arm can have a length greater than a length of an upper arm of the operator. Furthermore, the lower robotic arm can have a length greater than a length of a lower arm of the operator.

In one aspect, the figure illustrates a mobile base 280 for the robotic device 200 having a wheel configuration 282. The mobile base supports the support member 220 and the operator 201 and provides mobility for the robotic device. In another aspect, the mobile base can comprise an endless track configuration (see track 84 in FIG. 1). Whether incorporating a tracked or wheeled configuration, the mobile base can provide the ability to maneuver the robotic device in tight spaces. In one aspect, for example, the mobile base can execute a 360 degree turn without translational movement. In other words, the mobile base can execute a spin in one place. In another aspect, the mobile base can translate in any direction without turning. For example, the mobile base can execute a lateral move with the front of the robotic device remaining oriented toward the workspace.

Due, at least in part, to the operator's position relative to the robotic arm 212 of the robotic device 200, the mobile base 280 may be configured to position the operator 201 essentially within the robotic arm and relatively close to a workspace having objects to be picked up and moved by the robotic arm. This can allow the operator to have unencumbered vision of the robotic arm, the objects to be picked up and/or maneuvered by the robotic arm, and obstacles in the workspace. A good view of the workspace can enable the operator to correctly judge potential movement paths of the robotic arm and placement locations the objects.

The mobile base 280 can support the support member 220 of the robotic arm 212 with a structure that is located behind the operator 201. The absence of supporting structure in the front of the robotic device can preserve the operator's view of the workspace. This can also allow the operator to enter and exit the robotic device via the front and/or sides of the robotic device.

Figure 4:
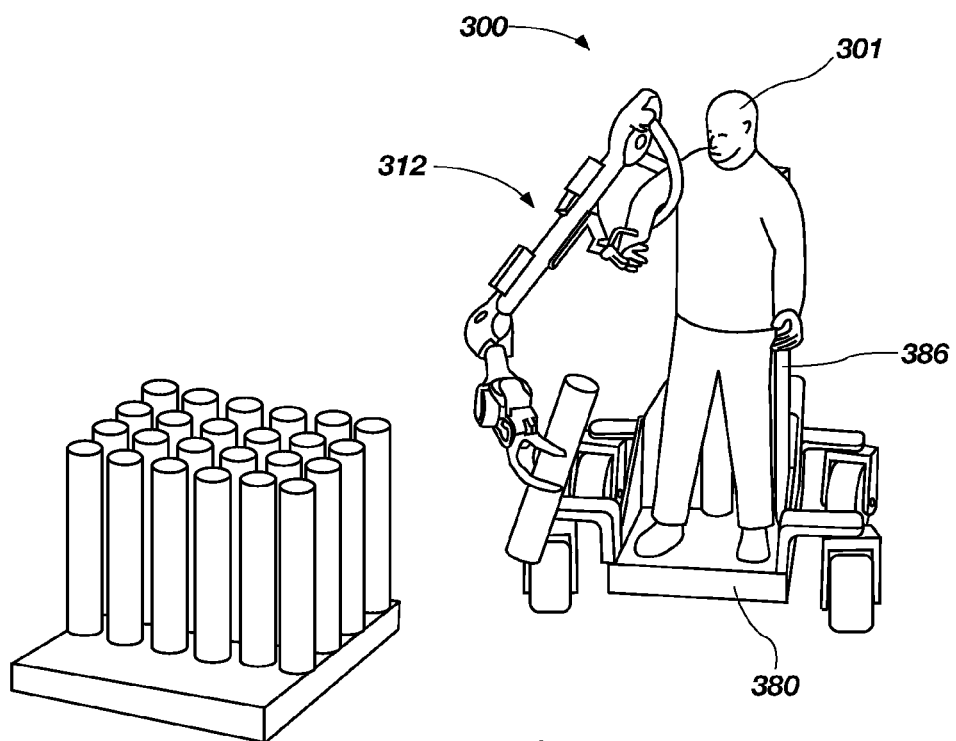
FIG. 4 illustrates an operator controlling a robotic device, in accordance with another example of the present disclosure.

With reference to FIG. 4, illustrated is a robotic device 300 having only a single robotic arm 312. The single robotic arm can include any of the sensors, drive systems, or control aspects discussed above with reference to FIGS. 1 and 2. The operator 301 can control mobility of the robotic device using a lever 386 or other interface with the robotic device to control the mobile base 380. The mobile base can house a motor, battery, or other power source to not only provide power to move the robotic device about, but also provide power for the various sensors, processors, drive systems, etc. of the robotic device. The robotic device can therefore be a self-contained unit that can move about and operate un-tethered to an external power or control source.

Thus, in general, a robotic device of the present disclosure can allow an operator to perform activities that would normally be difficult, impossible, or would require considerable time and energy to perform. The robotic device may be used by military personnel, construction workers, police, rescue personnel, or others to perform difficult or arduous tasks. The robotic device can reduce the number of personnel required to perform dangerous or hazardous tasks and reduce the physical stress experienced by personnel when executing such tasks. The robotic device can also be configured for application-specific tasks that might involve exposure to radiation, gas, chemical, or biological agents.

Because the robotic device can serve as a power amplifier, amplifying small motions and forces into controlled, large motions and forces, the robotic device can also be used to aid physically impaired individuals in executing otherwise impossible tasks. By strategically placing sensors and control devices in various locations on the robotic arm and/or control arm, individuals who are only capable of applying very small amounts of force could control the motion of the robotic device.

In addition to the previously mentioned applications for the robotic device, the present disclosure can be used in any number of applications that require strength, stamina, and precision enhancement without tethering the operator to a stationary power or control source. Additionally, safety devices such as power interrupts can be built into the robotic device to prevent unintentional movement of the robotic arm and harm to the operator.

It is to be understood that the above-referenced examples are illustrative of the application for the principles of the present disclosure. Numerous modifications and alternative arrangements can be devised without departing from the spirit and scope of the present disclosure while the present disclosure has been shown in the drawings and described above in connection with the example(s) of the disclosure. It will be apparent to those of ordinary skill in the art that numerous modifications can be made without departing from the principles and concepts of the disclosure as set forth in the claims.

What is claimed is:

1. An operator controllable robotic device, comprising:
   a support member;
   an upper robotic arm having a proximal end coupled to the support member and having rotational movement in at least one degree of freedom relative to the support member;
   a lower robotic arm having a proximal end coupled to a distal end of the upper robotic arm and having rotational movement in at least one degree of freedom relative to the upper robotic arm;
   a control arm to allow an operator to control the robotic device, the control arm having an extension member with a proximal end coupled to the upper robotic arm, and an operator interface located at a distal end of the extension member, the extension member extending from the upper robotic arm at a location such that the control arm and the upper robotic arm approximate an elbow joint of the operator, the control arm having rotational movement in at least one degree of freedom relative to the upper robotic arm, wherein the control arm allows the operator to interact with the robotic device such that a movement of the operator controls a movement of at least one of the upper robotic arm and the lower robotic arm; and
   a control system that controls a movement of the upper robotic arm and the lower robotic arm, wherein the control system utilizes a control scheme to move the upper robotic arm that is different than a control scheme to move the lower robotic arm.

2. The robotic device of claim 1, wherein the proximal end of the upper robotic arm is positioned to be proximate to a shoulder of the operator.

3. The robotic device of claim 1, wherein the coupling of the control arm and the upper robotic arm is positioned to be proximate to an elbow of the operator.

4. The robotic device of claim 1, wherein the control arm is coupled to the upper robotic arm between the proximal end and the distal end of the upper robotic arm.

5. The robotic device of claim 1, wherein the upper robotic arm has a length greater than a length of an upper arm of the operator.

6. The robotic device of claim 1, wherein the lower robotic arm has a length greater than a length of a lower arm of the operator.

7. The robotic device of claim 1, wherein a total extended length of the upper robotic arm and the lower robotic arm is between about four feet and about twelve feet.

8. The robotic device of claim 1, wherein the lower robotic arm includes a holding device coupled to a distal end of the lower robotic arm to secure an object.

9. The robotic device of claim 8, wherein the holding device has movement in at least one degree of freedom relative to the lower robotic arm.

10. The robotic device of claim 9, wherein the control arm includes a wrist controller coupled to the control arm and having rotational movement in at least one degree of freedom relative to the control arm to control movement of the holding device.

11. The robotic device of claim 10, wherein the holding device comprises a clamp and the control arm includes a finger controller coupled to the wrist controller and having movement in at least one degree of freedom relative to the wrist controller to control movement of the clamp.

12. The robotic device of claim 1, further comprising a force sensor coupled to at least one of the control arm and the upper robotic arm to sense an adjustable controlling interface force status relationship between the force sensor and the operator to control a movement of at least one of the upper robotic arm and the lower robotic arm.

13. The robotic device of claim 12, further comprising a force computational system to receive a force signal from the force sensor, calculate a force required to maintain the controlling force status relationship, and generate and transmit a force actuation signal.

14. The robotic device of claim 13, further comprising a drive system attached to at least one of the control arm and the upper robotic arm to receive the transmitted force actuation signal from the force computational system on an ongoing basis and displace a portion of at least one of the control arm and the upper robotic arm in order to maintain the controlling force status relationship.

15. The robotic device of claim 1, further comprising a position sensor coupled to the control arm to sense a position of the control arm to control movement of at least one of the upper robotic arm and the lower robotic arm.

16. The robotic device of claim 15, further comprising a position computational system to receive a position signal from the position sensor, calculate a position for at least one of the upper robotic arm and the lower robotic arm, and generate and transmit a position signal.

17. The robotic device of claim 16, further comprising a drive system attached to at least one of the upper robotic arm and the lower robotic arm to receive the transmitted position signal from the position computational system on an ongoing basis and displace at least one of the upper robotic arm and the lower robotic arm.

18. The robotic device of claim 1, further comprising a mobile base that supports the support member and provides mobility for the robotic device.

19. The robotic device of claim 18, wherein the mobile base comprises an endless track configuration.

20. The robotic device of claim 18, wherein the mobile base comprises a wheel configuration.

21. The robotic device of claim 1, wherein the control scheme to move the upper robotic arm includes a force sensor coupled to the upper robotic arm to sense an adjustable controlling interface force status relationship between the force sensor and the operator to control a movement of the upper robotic arm.

22. The robotic device of claim 1, wherein the control scheme to move the lower robotic arm includes a position sensor coupled to the control arm to sense a position of the control arm to control a movement of the lower robotic arm.

* * * * *